Aug. 30, 1966 C. H. BODE 3,269,612

MEASURING AND DISPENSING DEVICE

Filed Dec. 31, 1964

INVENTOR.
Charles H. Bode
BY Jennings Carter & Thompson
Attorneys

United States Patent Office 3,269,612
Patented August 30, 1966

3,269,612
MEASURING AND DISPENSING DEVICE
Charles H. Bode, Warrington, Pa., assignor of fifty percent to Russell O'Brien, Princeton, N.J., and fifty percent to T. Lawrence Johnson, Birmingham, Ala.
Filed Dec. 31, 1964, Ser. No. 422,658
3 Claims. (Cl. 222—197)

This invention relates to a measuring and dispensing device which is particularly adapted for powdered and granular materials such as powdered or ground coffee, detergents and the like and which may also be employed for dispensing liquids, suspensions and the like.

Heretofore in the art to which my invention relates, various devices have been devised for dispensing materials. However, the prior art dispensers with which I am familiar are not altogether suitable for dispensing substances which are hygroscopic and which consequently under conditions of ordinary humidity bridge or become sticky or lumpy. Also, such devices do not provide means for sealing the opening from the container carrying the material to be dispensed, thus permitting contamination of the materials by dust, insects and the like. Furthermore, many prior devices of this general type are complicated and do not readily lend themselves to mass production methods of fabrication.

An object of my invention is to overcome the foregoing objections by providing a device for dispensing from a jar, can or the like a measured quantity of material, which device embodies a rotary dispensing element which carries a plurality of angularly spaced compartments which are adapted to move into alignment with angularly spaced openings provided in a dispensing unit for the jar, can or the like, whereby an effective seal is provided between the angularly spaced openings in the dispensing unit.

Another object of my invention is to provide a dispensing device of the character designated in which means is provided to agitate or strike each compartment as the material is discharged therefrom, thereby assuring that all of the material is removed from the compartment.

A further object of my invention is to simplify the construction of the dispenser as a whole, thereby to make it capable of mass production either in metal, glass or of molded plastic-like materials.

A device illustrating features of my invention is shown in the accompanying drawing, forming a part of this application, in which:

FIG. 1 is a fragmental view showing the dispenser in place over the mouth of the conventional type container, such as a jar, filled with powdered coffee or the like;

Figure 2:
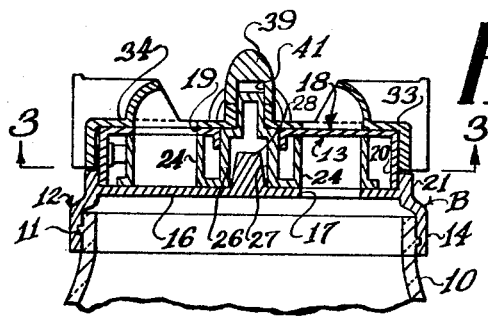
FIG. 2 is an enlarged sectional view taken generally along the line 2—2 of FIG. 1, showing the rotary dispenser in position for one compartment to receive the material while another compartment is in position to dispense the material.
Figure 1:
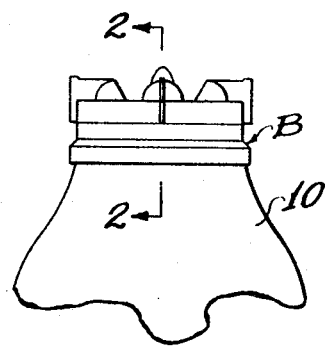

Referring now to the drawing for a better understanding of my invention, I show my improved dispenser attached to the mouth of a conventional type jar 10 by the usual threaded connection indicated generally at 11. The dispenser comprises a body B having an inner portion 12 and an outer portion 13. The inner portion 12 is provided with a depending annular flange 14 which is adapted to fit over and move into threaded engagement with the mouth of the jar 10, as clearly shown in FIG. 2. Extending transversely of the inner portion 12 is an inner wall 16 having a material inlet opening 17 therein whereby the material to be dispensed may flow from the container 10 into the dispensing unit.

Figure 4:
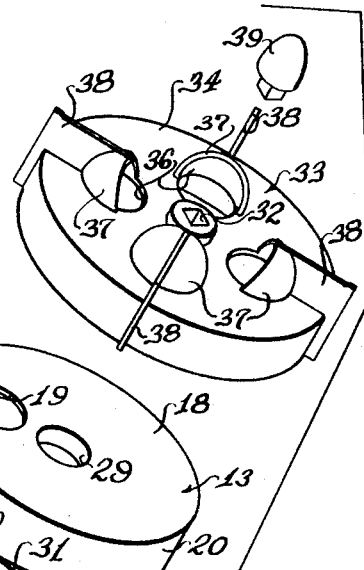
FIG. 4 is an exploded view showing the various parts of the dispensing device separated from each other and showing a fragment of the jar which is filled with the material to be dispensed.
Figure 4:
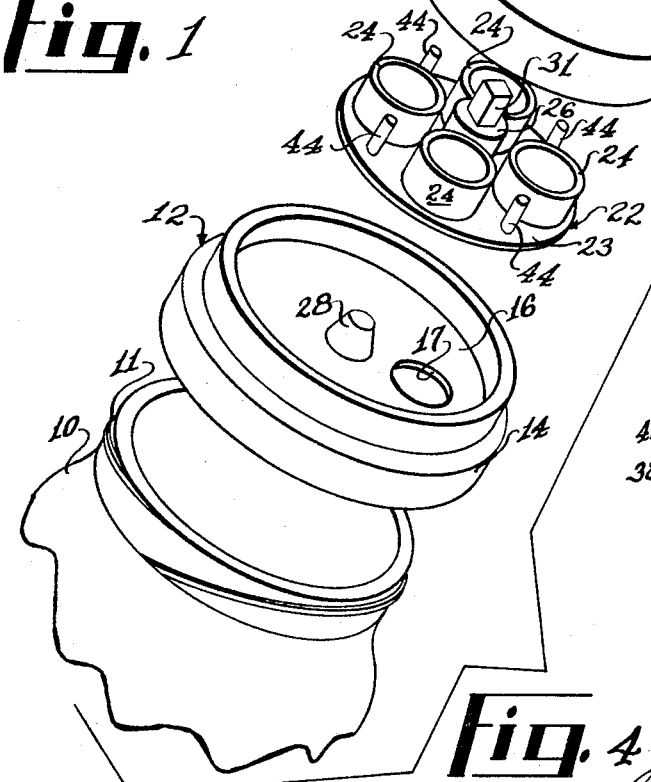

The outer portion 13 comprises an outer wall 18 having a material discharge opening 19 therethrough, as shown in FIGS. 2 and 4. Formed integrally with the outer wall 18 is a depending annular flange 20 which is adapted to telescope inwardly of an upstanding annular flange 21 carried by the inner portion 12, as shown in FIG. 2. The flanges 20 and 21 are secured to each other by suitable means, such as by applying an adhesive therebetween.

As shown in FIG. 2 the inner wall 16 is spaced from the outer wall 18 and mounted for rotation between the inner and outer walls is a rotatable dispenser indicated generally at 22. The rotatable dispenser comprises a disc-like member 23 which carries a plurality of angularly spaced compartments 24 having opened inner and outer ends, as shown. The compartments 24 may be defined by sleeve-like members which are formed as an integral part of the disc-like member 23. The open ends of the compartments 24 engage the adjacent surfaces of the inner and outer walls 16 and 18, as shown in FIG. 2, to provide a material tight seal therebetween. Also, the compartments 24 are spaced angularly from each other a distance equal the angular distance between the openings 17 and 19 in the body B. It will be noted that the openings 17 and 19 and each of the compartments 24 are all equidistant from the center of the rotatable dispenser 22 whereby the open ended compartments 24 are adapted to register with or move into alignment with the openings 17 and 19, as shown in FIG. 2.

Formed integrally with the disc-like member 23 is an upstanding shaft member 26 having an open lower end 27 which is disposed to slidably engage an upstanding bearing member 28 carried by the inner wall 16, as shown in FIGS. 2 and 4. An opening 29 is provided in the outer wall 18 for receiving the outer end of the shaft 26, as shown. The outer end of the shaft is square or provided with flat surfaces 31 which are adapted to engage flat surfaces of a square opening 32 provided in a cover member 33.

The cover member 33 comprises a disc-like member 34 having a plurality of angularly spaced openings 36 therein which are in vertical alignment with the subjacent compartments 24. Accordingly, the openings 36 are adapted to move successively into register with the material discharge opening 19 for dispensing material. Suitable pouring spouts 37 are formed integrally with the disc-like member 34 which also serve as shield members for the openings 36.

A plurality of vertically extending fin-like members 38 are carried by the cover member 33 to facilitate rotation of the cover member and the rotatable dispenser 22 connected thereto by the engagement of the square portion 31 of the shaft with the square opening 32. The cover member 33 is held in place by a cap 39 having a downwardly opening recess 41 which is square, as viewed in cross section, for engagement with the square portion 31 of the shaft 26. The cap 39 is secured in place by applying a suitable adhesive between the cap and the square portion 31 of the shaft.

Figure 3:
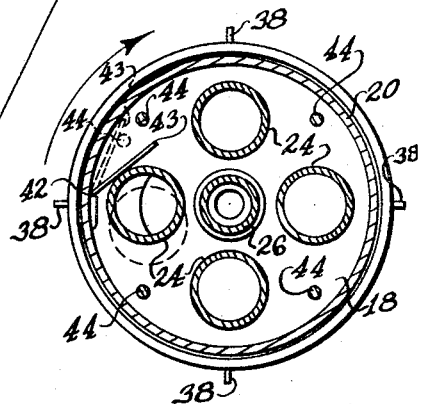
FIG. 3 is a sectional view taken generally along the line 3—3 of FIG. 2.

To agitate each compartment 24 as the material is dispensed therefrom, one end 42 of a spring-like member 43, such as a leaf spring, is secured to the inner surface of the depending flange 20 whereby the free end of the spring-like member is adapted to engage the outer surface of a container 24 as it moves into alignment with the material discharge opening 19, as shown in solid lines in FIG. 3. Angularly spaced detents 44 are carried by the disc-like member 23 in position to engage the free end of the spring member 43 just prior to movement of its associated container 24 into alignment with the material discharge opening 19, as shown in dotted lines in FIG. 3. That is, as the rotatable dispenser 22 is rotated, the detents 44 engage the spring-like members 43 to thus move the free ends thereof to the dotted line position shown in FIG. 3. Continued rotation of the detents 44 causes the detent to move out of engagement with the free end of the spring-like member 43 whereupon the spring-like member moves inwardly to strike the compartment 24 which is in alignment with the material dispensing opening 19. It will be noted that a detent 44 is provided in advance of each of the compartments 24, as shown in FIG. 3.

From the foregoing description, the operation of my improved measuring and dispensing device will be readily understood. The dispenser is attached to the mouth of a container 10 carrying the material to be dispensed, as shown in FIG. 2. To dispense the material, the container 10 is inverted whereupon the material in the container 10 flows through the material inlet opening 17 into the compartment 24 in alignment therewith. Upon rotation of the rotatable dispenser 22 by turning the cover member 33, the angularly spaced compartments 24 are moved successively into alignment with the material inlet openings 17 whereby they are filled with the material from the container 10. It will be understood that the container 10 is held in an inverted position during rotation of the rotatable dispenser 22.

As the compartment 24 filled with the material to be dispensed moves into alignment with the material discharge opening 19, a detent 44 engages the spring-like member 43 and moves the same to the dotted line position. As the detents reaches the free end of the spring 43, the spring is released suddenly whereby it moves to the solid line position shown in FIG. 3 to thereby strike the compartment 24 which is then in alignment with the material discharge opening 19. By striking the compartment 24 immediately upon movement into alignment with the material discharge opening 19, all of the material within the compartment 24 is discharged therefrom with a minimum of effort. The dispensing operation is repeated by rotating the rotatable dispenser 22 whereby the compartments 24 filled with the material are moved successively into alignment with the material discharge opening 19.

From the foregoing, it will be seen that I have devised an improved dispenser for various types of materials. By providing a rotatable dispenser which is adapted to be moved to selected angular positions, the dispensing operation is repeated by merely inverting the container 10 and rotating the dispenser to position a filled compartment in alignment with the material discharge opening 19. By positioning the material discharge opening 19 an angular distance from the material inlet opening 17, together with the sliding contact between the open ends of the compartments 24 with the inner surfaces of the walls 16 and 18, an effective seal is provided whereby the openings 17 and 19 are never in direct communication with each other. Accordingly, the contents of the container 10 are maintained in a sanitary condition at all times. Also, by providing a spring-like member, such as a leaf spring 43, which strikes the compartment at the exact time that the material is being discharged therefrom, all of the material in the compartment is removed in an efficient manner and without having to shake the entire container 10 and the dispensing unit carried thereby.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:
1. In a measuring and dispensing device,
   (a) a body having a portion disposed for attachment to a container having therein a supply of the material to be dispensed,
   (b) inner and outer spaced apart walls carried by said body,
   (c) a rotatable dispensing member mounted for rotation between said inner and outer walls,
   (d) there being a material inlet opening through said inner wall and a material discharge opening through said outer wall, the inlet and discharge openings being spaced substantially equidistant from the center of said dispensing member and being spaced angularly from each other,
   (e) compartments carried by an positioned equidistant from the center of said dispensing member and spaced angularly equidistant from each other to position successive compartments in alignment with said inlet opening upon movement of successive compartments into alignment with said discharge opening with the ends of said compartments being open and disposed to slide substantially material tight against the adjacent surfaces of said inner and outer walls,
   (f) means to rotate said dispensing member while said body is in dispensing position to align said compartments successively with said material inlet opening and said material discharge opening whereby said material is introduced into the compartment in alignment with said inlet opening and said material is discharged from the compartment in alignment with said discharge opening,
   (g) a resilient member carried by said body and urged toward a position to engage a compartment as it moves into alignment with said material discharge opening, and
   (h) means carried by said rotatable dispensing member in position to engage said resilient member and move the same away from said compartments and then release said resilient member whereby it strikes said compartment which is in alignment with said discharge opening.
2. In a measuring and dispensing device as defined in claim 1 in which the resilient member is a leaf spring anchored adjacent one end to said body.
3. In a measuring and dispensing device as defined in claim 1 in which a detent is carried by said rotatable dispensing member in position to engage said resilient member in response to rotation of said rotatable dispensing member.

References Cited by the Examiner
UNITED STATES PATENTS

| | | | |
|---|---|---|---|
| 1,184,074 | 5/1916 | Clark | 221—265 X |
| 1,717,025 | 6/1929 | Green | 222—370 X |
| 2,543,934 | 3/1951 | Poskey | 222—370 |
| 2,761,592 | 9/1956 | Lewis et al. | 222—370 |
| 3,079,051 | 2/1963 | Clark et al. | 222—370 |

ROBERT B. REEVES, *Primary Examiner.*

HADD S. LANE, *Examiner.*